United States Patent
Khoury

(10) Patent No.: US 6,860,764 B2
(45) Date of Patent: Mar. 1, 2005

(54) MODULAR APPLIANCE

(75) Inventor: Edward Joseph Khoury, Bateman (AU)

(73) Assignee: Stanley Joseph Seeff, Glenhazel (ZA)

( * ) Notice: Subject to any disclaimer, the term of this patent is extended or adjusted under 35 U.S.C. 154(b) by 0 days.

(21) Appl. No.: 10/181,353

(22) PCT Filed: Dec. 21, 2000

(86) PCT No.: PCT/IB00/01929

§ 371 (c)(1),
(2), (4) Date: Oct. 2, 2002

(87) PCT Pub. No.: WO01/52704

PCT Pub. Date: Jul. 26, 2001

(65) Prior Publication Data

US 2003/0092322 A1 May 15, 2003

(30) Foreign Application Priority Data

| Jan. 24, 2000 | (AU) | ............................................. PQ 5219 |
| Jun. 21, 2000 | (ZA) | ........................................... 2000/3110 |
| Jul. 18, 2000 | (ZA) | ........................................... 2000-3605 |

(51) Int. Cl.[7] .............................................. H01R 25/00
(52) U.S. Cl. ........................ 439/638; 439/715; 439/701
(58) Field of Search ................................. 439/715, 717, 439/638, 214, 929, 928, 701, 620; 220/3.2, 3.92, 3.94, 4.01, 4.02; 320/116, 107

(56) References Cited

U.S. PATENT DOCUMENTS

| 3,608,988 A | * | 9/1971 | Amberg ...................... 439/929 |
| 3,915,079 A | * | 10/1975 | Balderson ................... 439/929 |
| 4,575,255 A | | 3/1986 | Kafka |
| 4,591,777 A | | 5/1986 | McCarty et al. |
| 4,620,476 A | | 11/1986 | Brym |
| 4,739,242 A | | 4/1988 | McCarty et al. |
| 5,039,929 A | * | 8/1991 | Veistroffer et al. .......... 320/107 |
| 5,334,033 A | * | 8/1994 | Milan ......................... 439/214 |
| 5,415,572 A | * | 5/1995 | Shepherd .................... 439/638 |
| 5,685,744 A | * | 11/1997 | Blanchot et al. ............ 439/701 |
| 5,765,796 A | | 6/1998 | Lanus |
| 6,137,260 A | * | 10/2000 | Wung et al. ................. 320/116 |
| 6,204,632 B1 | * | 3/2001 | Nierescher et al. ......... 439/951 |
| 6,340,807 B2 | * | 1/2002 | Wang .......................... 219/429 |
| 6,475,036 B2 | * | 11/2002 | Morikawa .................... 439/716 |
| 6,634,910 B2 | * | 10/2003 | Lieb et al. ................... 439/717 |

FOREIGN PATENT DOCUMENTS

| DE | 297 02 211 U | | 5/1997 | |
| GB | 2 186 184 | | 8/1987 | |
| GB | 2189354 | * | 10/1987 | ........... H01R/11/00 |
| WO | WO96/22718 | | 8/1996 | |
| WO | WO 08/097927 | * | 12/2002 | ......... H01R/13/514 |

OTHER PUBLICATIONS

Lieb et al (US 2002/0182942), "Electric Appliance Comprising Modules that can be Juxtaposed".*

* cited by examiner

Primary Examiner—Dean A. Reichard
Assistant Examiner—Angel R. Estrada
(74) Attorney, Agent, or Firm—Burns, Doane, Swecker & Mathis, L.L.P.

(57) ABSTRACT

A modular appliance system comprises several similarly shaped modular appliances such as kettles, toasters and the like, and a modular base system with cordless connectors on which the appliances can be placed. In one embodiment, the base is larger than the base of an individual appliance, and accommodates two or more appliances side by side. In another embodiment, the base comprises individual base units which can be connected together electrically to create a composite base unit which accommodates the required number of appliances.

15 Claims, 3 Drawing Sheets

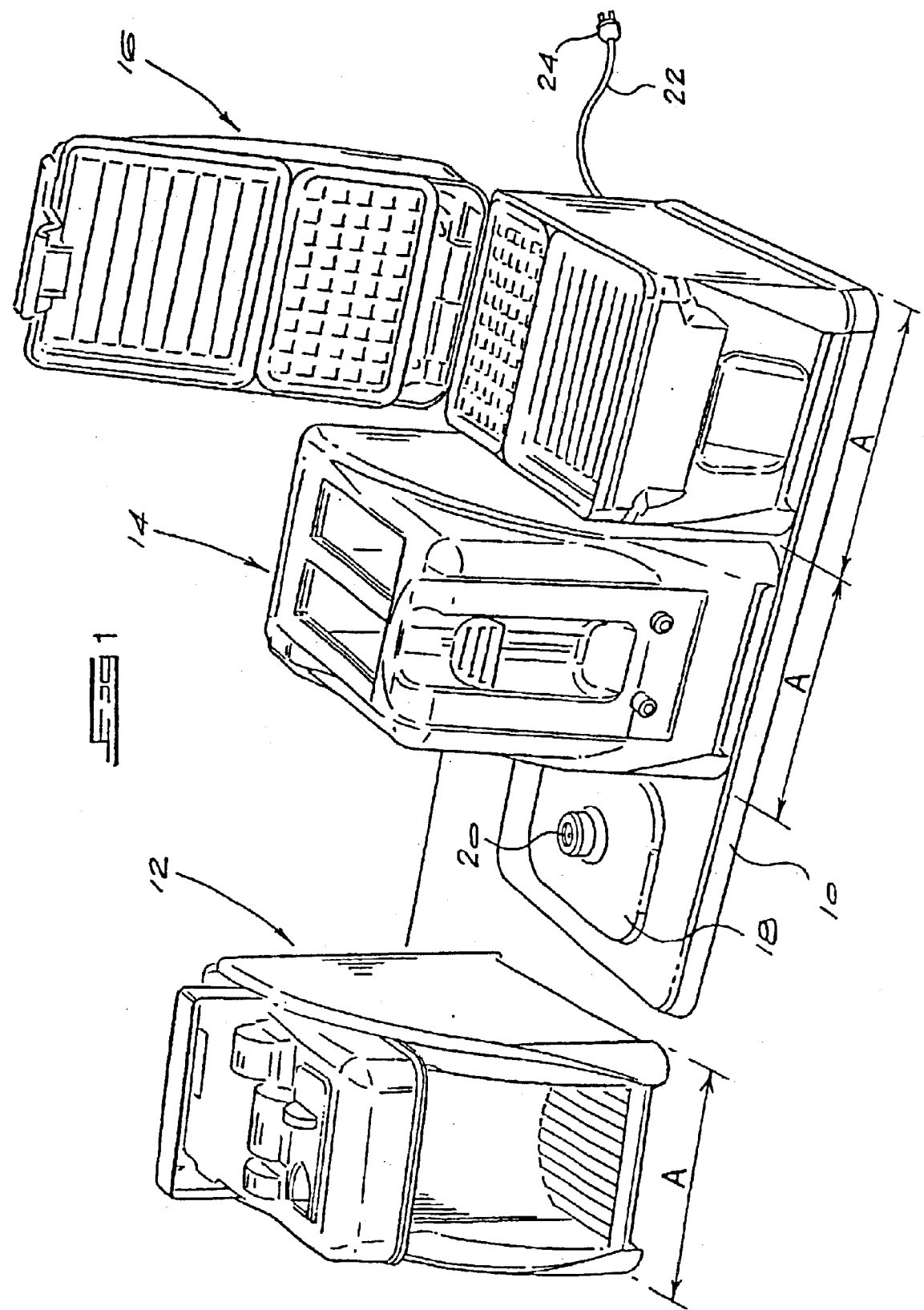

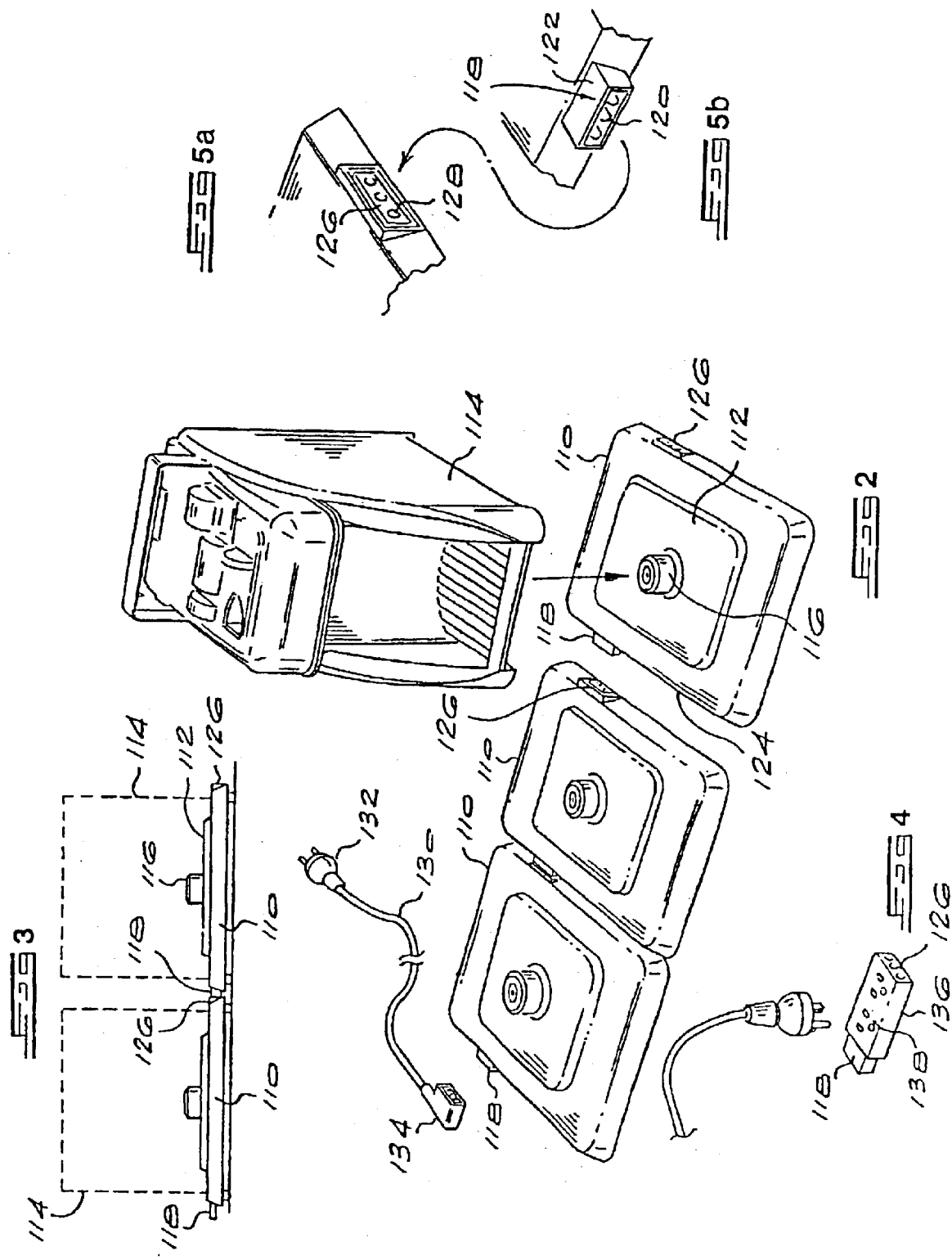

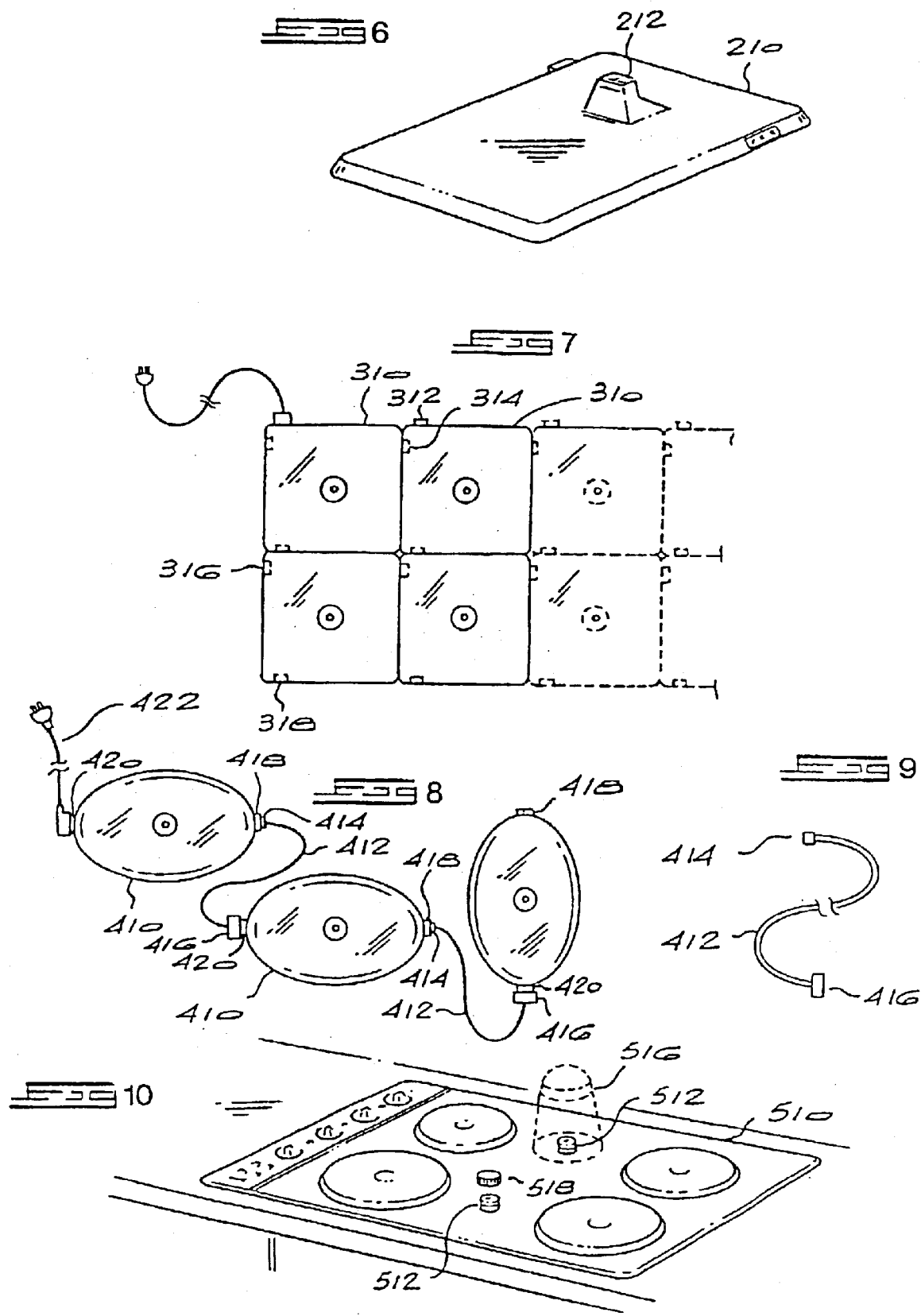

MODULAR APPLIANCE

BACKGROUND OF THE INVENTION

This invention relates to a modular appliance system.

Modern homes tend to be relatively compact and space is usually at a premium in working areas such as kitchens. At the same time, the number of appliances available is increasing and an average home owner will typically have at least a kettle, a toaster, a coffee maker and one or more other counter-top appliances in his or her kitchen. This leads to crowding and clutter in the kitchen.

It is an object of the invention to address this phenomenon.

SUMMARY OF THE INVENTION

According to the first aspect of the invention there is provided a modular appliance system comprising:

a plurality of modular appliances; and a base unit for supporting at least two of the modular appliances simultaneously, the base unit having at least two electrical connectors adapted for engagement with complemental connectors on respective appliances, thereby to connect the appliances to an electrical source via the base unit.

According to the second aspect of the invention there is provided a modular appliance system comprising:

a plurality of modular appliances; and a base unit comprising a plurality of interconnectable base elements, at least a first one of the base elements being connectable to an electrical source and at least a second base element being electrically connectable to the first base element so that the second base element is connected to the electrical source via the first base element, each of the base elements having at least one electrical connector adapted for engagement with a complemental connector on a respective appliance so that one or more appliances can be connected to the electrical source via the base unit.

The system preferably may comprise a plurality of substantially identical base elements, with each base element having a first connector for connection to a previous base element and a second connector for connection to a subsequent base element.

Typically the first connector of each base element comprises a plurality of pins, which may be shrouded.

The second connector typically comprises a plurality of sockets shaped to receive the respective pins of the first connector.

The base unit is preferably generally planar and defines at least one locating formation which mates with complemental locating formations in the base of a respective appliance.

Each locating formation may be an upstanding land on an upper surface of the base unit, in which case the complemental locating formation in the base of the respective appliance is a cavity shaped complementally to the land.

Each appliance may have a footprint which is substantially identical to that of the other appliances, so that the appliances may be located interchangeably on the base unit.

One or more of the appliances may have a footprint which is a multiple of the footprint of the other devices, so that it engages at least two of the locating formations on the base unit.

The invention extends to a base unit for use in a modular appliance system as defined above, the base unit comprising a generally planar body defining at least two locating formations which mate with complemental formations in the base of respective appliances and having at least two electrical connectors adapted for engagement with complemental connectors on respective appliances, thereby to connect the appliances to an electrical source via the base unit.

The invention further extends to a base unit for use in a modular appliance system as defined above, the base unit comprising a plurality of interconnectable base elements, at least a first one of the base elements being connectable to an electrical source and at least a second base element being electrically connectable to the first base element so that the second base element is connected to the electrical source via the first base element, each of the base elements having at least one electrical connector adapted for engagement with a complemental connector on a respective appliance so that one or more appliances can be connected to the electrical source via the base unit.

BRIEF DESCRIPTION OF THE DRAWINGS

FIG. 1 is a pictorial view of a first embodiment of a modular appliance system according to the invention;

FIG. 2 is a pictorial view of a second embodiment of a modular appliance system according to the invention;

FIG. 3 is a front view of a modular base unit of the system of FIG. 2;

FIG. 4 is a pictorial view of a multi-plug adapter usable with the modular base unit of FIG. 3;

FIGS. 5a & 5b are end views of a female connector and a male connector respectively of the modular base unit;

FIG. 6 is a pictorial view of an alternative embodiment of a base element of the modular base unit shown in FIGS. 2, 3 and 5;

FIG. 7 shows a further embodiment of the modular base unit, in which individual base elements have multiple electrical connectors thereon;

FIG. 8 shows another embodiment of a modular base unit in which individual base elements are interconnected by means of flexible electrical cables;

FIG. 9 illustrates a single electrical connector cable for use with the base unit of FIG. 8; and FIG. 10 shows an embodiment of the invention in which the base unit of the invention comprises a stove hob.

DESCRIPTION OF EMBODIMENTS

The modular appliance system illustrated in FIG. 1 comprises a generally planar base unit 10 which is moulded from a suitably tough and heat resistant plastics material such as polypropylene, and a set of modular appliances 12, 14 and 16 which can be mounted on the base unit individually or together, side by side. The base can be formed from other suitable plastics, or other materials including metals such as stainless steel, or natural materials such as marble or wood.

In FIG. 1, the appliance 12 is a hot water dispensing unit, the appliance 14 is a toaster, and the appliance 16 is a sandwich toaster/waffle iron. It will be appreciated that the illustrated appliances are merely exemplary, and that the set of appliances usable on the base 10 may include various other appliances, or more than one identical appliance.

The base 10 is rectangular and is provided with a plurality of locating formations in the form of upstanding rectangular lands 18 having rounded corners, each of which has a central upstanding cordless connector 20 of a kind known as such which mates with a complemental connector on the underside of the appliances 12, 14 and 16. The underside of each appliance defines a recess which is shaped complementally to the land 18, so that when the appliance is mounted on the base, it is located firmly against both lateral movement in the plane of the base and rotation. This helps to ensure stability of the appliances in use, and also ensures that appliances are not misaligned on the base, which would interfere with the placing of adjacent appliances on the base.

As indicated by the arrows A, the appliance 12 has a "footprint" which is the same as that of the appliances 14 and 16. Additionally, all of the appliances have the same depth from front to back, although this is not essential. Because of their identical footprints, the appliances are interchangeable and it is not necessary for them to be located in a particular predetermined position on the base in use.

Certain appliances may have a footprint which is a multiple of the standard footprint A. For example, a hotplate appliance might have a footprint which is double the width of the standard footprint. Assuming that such an appliance had two cooking plates, each cooking plate could conveniently be connected to a respective cordless connector 20 on the base, to reduce the current carried by each connector.

Depending on the intended application of the appliance system, the base 10 could be fixed to a work top and connected to a mains supply by hidden wiring passing through the work top surface. Alternatively, the base 10 can be fitted with a conventional two or three core cable 22 and a conventional mains plug 24 for connection to a wall outlet.

The base 10 can be provided in a number of different configurations, including single, double and triple-appliance units. Also, instead of a rectangular base arranged to locate the individual modular appliances side-by-side as described above, a curved or specially shaped base can be provided to locate the appliances in a circular or semi-circular configuration, or in a square or other formation.

Instead of a single base for locating and connecting one or more modular appliances, as described above with reference to FIG. 1, the embodiment of FIGS. 2 to 5 provides a modular base unit comprising individual base elements which can be plugged together in a "daisy chain" configuration to make up a base unit which caters for as many different appliances as required.

Referring to FIG. 2, a base unit comprising three base elements 110 is shown. Each base element 110 is moulded from a suitably tough and heat resistant plastics material such as polypropylene and is generally rectangular, being deeper from front to back than it is wide. Each base unit has a central locating formation in the form of an upstanding rectangular land 112 which mates with a recess or cavity on the underside of a modular appliance 114 (only one of which is shown in FIG. 2). Additionally, each base unit has an upstanding cordless connector 116 which mates with a complemental connector on the underside of the appliance 114, thus connecting the appliance electrically to the base element.

Each base element 110 has a first connector 118 which comprises a set of male pins 120 (typically three pins, for the earth, live and neutral of a mains AC supply) with a rectangular shroud 122 surrounding the pins. The pins and the shroud extend proud of one edge 124 of the base unit. On the other side of each base unit is a complemental connector 126 in which a plurality of sockets 128 are located which mate with the pins 120. Thus, by locating two or more base units side by side, aligning their respective first and second connectors and pushing the connectors together, a modular base unit can be created comprising two or more of the base elements. It will be appreciated that various connection or plug/socket configurations are possible, and that the described arrangement is purely exemplary.

Obviously, the number of base elements which can be connected together in practice will be limited by the current drawn by the appliances used with the modular base unit, the current rating of the connectors, and the rating of the wall outlet or other electrical source used. In addition, the modular appliance could include a re-settable safety overload device which disconnects the electrical supply to the connectors 116 if there is a current overload.

The left-most base element in FIG. 2 is connected to an AC mains outlet via a connector cable 130 which has a conventional mains plug 132 at one end and female plug 134 at the other end, defining a connector essentially similar to that shown in FIG. 5a.

To enhance the versatility of the above described modular base unit, a multi-plug adapter 136 is provided, which has a first connector 118 at one end thereof and a second connector 126 at the other end thereof, so that the adapter can be plugged into the last free connector 126 on an assembled base unit, for example, and used to connect other appliances via sets of sockets 138 in its surface.

FIGS. 6, 7 and 8 show variations of the modular base unit. In FIG. 6, a modular base element 210 is shown which is similar to the base units 110 of FIGS. 2, 3 and 5. However, this version of the base element has a different upstanding cordless connector 212, of a kind known as such, which is not circular and which requires an appliance (not shown) having a complemental connector to be oriented correctly relative to the base element when being placed thereon so that the connectors mate properly. In this case, the cordless connector 212 serves the purpose of orienting and locating the appliance correctly on the base element, so that an upstanding land is not needed on the base element.

FIG. 7 shows a variation of the modular base unit in which each base element 310 has two sets of electrical connectors on adjacent edges of the base element, allowing the base elements to be assembled in a square or rectangular configuration as shown. Specifically, each base element 310 has first and second protruding connectors 312 and 314 which correspond to the connectors 118 of FIG. 2, and first and second complemental connectors 316 and 318 (corresponding to the connectors 126 of FIG. 2) on respective opposite edges of the base element. In applications where it might be desirable to provide an "island" of appliances, for example on a table which can be accessed from more than one side, this feature allows a desired number of base elements to be connected together, to accommodate the necessary appliances.

Referring now to FIGS. 8 and 9, a variation of the invention is shown in which a plurality of base elements 410 are connected together in a daisy chain arrangement by means of flexible connector modules 412, each of which comprises a length of electrical cable terminated at one end in a male connector 414 and at the other end in a female connector 416. The connector 414 fits into connectors 418 corresponding to the connectors 126 of FIG. 2, while the connector 416 fits into connectors 420 corresponding to the connectors 118 of FIG. 2. A plug and socket module 422 similar to that shown in FIG. 2 connects the daisy chained base elements to a mains outlet. An advantage of this arrangement is that it allows greater flexibility in the location of the individual base elements.

By providing a modular base unit as described above, the versatility of the modular appliance system is enhanced, and it can be extended or reduced in size as required, rather than requiring a user to replace a given base unit with a larger or smaller one.

Finally, FIG. 10 shows a stove hob 510 which is generally conventional, except that the hob serves as a base unit for purposes of the present invention, with a pair of upstanding cordless connectors 512 located between the hotplates 514 of the hob. An appliance 516 (shown in dotted outline in FIG. 10) which may be a full sized appliance as shown in FIGS. 1 and 2, or a smaller appliance, can be located at will on either of the connectors. A protective cap 518 can be provided to cover each connector when it is not in use, to protect it from spilt liquids and the like. In a variation of this embodiment, one or more of the conventional hotplates could be replaced by a connector 512.

It will be appreciated that the exact shape and configuration of the base units and individual base elements described above, the connectors utilized to interconnect individual base elements, and the configuration and location of the electrical connectors on the base units/base elements is purely exemplary and that numerous variations are possible without departing from the spirit and scope of the invention.

What is claimed is:

1. A modular appliance system comprising:
   a plurality of modular appliances; and
   a generally planar base unit comprising a plurality of interconnectable base elements, at least a first one of the base elements being connectable to an electrical source and at least a second base element being electrically connectable to the first base element so that the second base element is connected to the electrical source via the first base element, each of the base elements having at least one electrical connector adapted for engagement with a complemental connector on a respective appliance so that one or more appliances can be connected to the electrical source via the base unit, and
   wherein the base unit defines at least one locating formation which mates with a complemental locating formation in the base of a respective appliance;
   and wherein each locating formation comprises an upstanding land on an upper surface of the base unit, and the complemental location formation in the base of the respective appliance comprises a cavity shaped complementally to the land.

2. A modular appliance system according to claim 1 comprising a plurality of substantially identical base elements, with each base element having a first connector for connection to a previous base element and a second connector for connection to a subsequent base element.

3. A modular appliance system according to claim 2 wherein the first connector of each base element comprises a plurality of pins.

4. A modular appliance system according to claim 3 wherein the plurality of pins are shrouded.

5. A modular appliance system according to claim 2 wherein the first connector of each base element comprises a plurality of pins and wherein the second connector comprises a plurality of sockets shaped to receive the respective pins of the first connector.

6. A modular appliance system according to claim 2 wherein each base element has two first connectors, one on each of two adjacent edges of the base element, and two second connectors, one on each of two different adjacent edges thereof.

7. A modular appliance system according to claim 2 including at least one flexible electrical cable connectable between first and second connectors, respectively, of adjacent base elements.

8. A modular appliance system comprising:
   a plurality of modular appliances; and
   a generally planar base unit for supporting at least two of the modular appliances simultaneously, the base unit having at least two electrical connectors adapted for engagement with complemental connectors on respective appliances, thereby to connect the appliances to an electrical source via the base unit, the base unit defining at least one locating formation which mates with at least one complemental locating formation in the base of a respective appliance;
   wherein each locating formation comprises an upstanding land on an upper surface of the base unit, and the complemental locating formation in the base of the respective appliance comprises a cavity shaped complementally to the land.

9. A modular appliance system according to claim 8 wherein each appliance has a footprint which is substantially identical to that of the other appliances, so that the appliances may be located interchangeably on the base unit.

10. A modular appliance system according to claim 8 wherein one or more of the appliances has a footprint which is a multiple of the footprint of the other devices, so that it engages at least two of the locating formations on the base unit.

11. A base unit for use in a modular appliance system comprising a plurality of modular appliances, the base unit comprising a generally planar body defining at least two locating formations, each locating formation comprising an upstanding land on an upper surface of the base unit, which mates with a complemental formation in the base of a respective appliance that has a cavity shaped complementally to the land, and having at least two eletrical connectors adapted for engagement with complemental connectors on respective appliances, thereby to connect the appliances to an electrical source via the base unit.

12. A base unit for use in a modular appliance system comprising a plurality of modular appliances, the base unit comprising a generally planar body defining at least two locating formations, each locating formation comprising an upstanding land on an upper surface of the base unit, which mates with a complemental formation in the base of a respective appliance that has a cavity shaped complementally to the land, and a plurality of interconnectable base elements forming said body, at least a first one of the base elements being connectable to an electrical source and at least a second base element being electrically connectable to the first base element so that the second base element is connected to the electrical source via the first base element, each of the base elements having at least one electrical connector adapted for engagement with a complemental connector on a respective appliance so that one or more appliances can be connected to the electrical source via the base unit.

13. A modular appliance system comprising:
   a plurality of modular appliances, each appliance having in its base an input connection, and a cavity forming a locating formation; and
   a base unit for supporting at least two of the modular appliances simultaneously the base unit being generally planar and having an upper surface and at least two electrical connectors engaging with complemental input connectors on respective appliances, thereby to connect the appliances to an electrical source via the base unit, the base unit defining at least one locating formation in the form of an upstanding land on said upper surface, said land being shaped complementally to and mating with said cavity in one of the modular appliances.

14. A system according to claim 13, wherein the base unit comprises a plurality of locating formations which mate respectively with said cavities of the plurality of modular appliances.

15. A modular appliance system comprising:

a plurality of modular appliances, each appliance having in its base an input connector and a cavity forming a locating formation; and a base unit comprising a first generally planar base element being connectable to an electrical source and having at least one electrical connector adapted for engagement with a complemental input connector on an appliance, and having a locating formation in the form of an upstanding land on an upper surface of the base unit, said land being complementally shaped to the cavity and mating therewith; and a second generally planar base element being electrically connectable to the first base element so that the second base element is connected to the electrical source via the first base element, and having at least one electrical connector adapted for engagement with a complemental input connector on an appliance, and having a locating formation in the form of an upstanding land on an upper surface of the base unit, said land being complementally shaped to the cavity and mating therewith.

* * * * *